(12) United States Patent
Makino et al.

(10) Patent No.: US 9,978,492 B2
(45) Date of Patent: May 22, 2018

(54) COIL, ROTATING ELECTRICAL MACHINE, AND LINEAR MOTOR

(71) Applicant: KABUSHIKI KAISHA YASKAWA DENKI, Kitakyushu-shi (JP)

(72) Inventors: Shogo Makino, Kitakyushu (JP); Tuyoshi Nonaka, Kitakyushu (JP); Mitsunori Kamo, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 569 days.

(21) Appl. No.: 14/645,424

(22) Filed: Mar. 12, 2015

(65) Prior Publication Data

US 2015/0187477 A1 Jul. 2, 2015

Related U.S. Application Data

(63) Continuation of application No. PCT/JP2012/075156, filed on Sep. 28, 2012.

(51) Int. Cl.
*H02K 3/18* (2006.01)
*H01F 5/00* (2006.01)
(Continued)

(52) U.S. Cl.
CPC .............. *H01F 5/00* (2013.01); *H01F 5/02* (2013.01); *H01F 5/04* (2013.01); *H02K 3/12* (2013.01);
(Continued)

(58) Field of Classification Search
CPC .. H02K 3/12; H02K 3/18; H02K 3/28; H02K 3/524; H02K 41/02; H02K 41/031; H02K 5/20; H02K 9/10; H02K 9/22
See application file for complete search history.

(56) References Cited

U.S. PATENT DOCUMENTS 7,053,515 B2  5/2006 Nakanishi et al.
7,091,645 B2 * 8/2006 Yoneda ............... H02K 3/18
                                                      29/605

(Continued)

FOREIGN PATENT DOCUMENTS

JP   56-157232    12/1981
JP   2000-197294   7/2000
(Continued)

OTHER PUBLICATIONS

The International Preliminary Report on Patentability (Chapter I) with translation of Written Opinion of the International Searching Authority for corresponding International Application No. PCT/JP2012/075156, Apr. 9, 2015.

(Continued)

*Primary Examiner* — Dang Le
(74) *Attorney, Agent, or Firm* — Mori & Ward, LLP

(57) ABSTRACT

This disclosure discloses a coil. An outer shape of the coil as viewed from the first direction has an approximately rectangular shape or an approximately square shape with four corner parts. The coil includes at least one parallel part extended parallelly along the circumferential direction, and at least one connecting part arranged at a portion corresponding to any of the four corner parts, the at least one connecting part being extended along a diagonal direction with respect to the circumferential direction to connect the two parallel parts.

14 Claims, 13 Drawing Sheets

(51) Int. Cl.
  *H02K 3/12* (2006.01)
  *H02K 3/28* (2006.01)
  *H02K 9/10* (2006.01)
  *H02K 41/02* (2006.01)
  *H02K 41/03* (2006.01)
  *H02K 15/04* (2006.01)
  *H01F 5/02* (2006.01)
  *H01F 5/04* (2006.01)
  *H02K 9/22* (2006.01)
  *H02K 3/52* (2006.01)
  *H02K 5/20* (2006.01)
  *H01F 41/071* (2016.01)

(52) U.S. Cl.
  CPC .................. *H02K 3/18* (2013.01); *H02K 3/28* (2013.01); *H02K 9/10* (2013.01); *H02K 15/045* (2013.01); *H02K 41/02* (2013.01); *H02K 41/031* (2013.01); *H01F 41/071* (2016.01); *H02K 3/524* (2013.01); *H02K 5/20* (2013.01); *H02K 9/22* (2013.01)

(56) References Cited

U.S. PATENT DOCUMENTS 8,058,766 B2\* 11/2011 Hoshino .............. H02K 15/095
  310/179
2004/0256919 A1\* 12/2004 Hashimoto ............ H02K 41/03
  310/12.25
2005/0218744 A1 10/2005 Nakanishi et al.

FOREIGN PATENT DOCUMENTS

| JP | 2005-318669 | 11/2005 |
| JP | 2006-288025 | 10/2006 |
| JP | 2007-089400 | 4/2007 |
| WO | WO 2004/038893 | 5/2004 |

OTHER PUBLICATIONS

International Search Report for corresponding International Application No. PCT/JP2012/075156, dated Dec. 18, 2012.
Written Opinion for corresponding International Application No. PCT/JP2012/075156, dated Dec. 18, 2012.

\* cited by examiner

[FIG.1]
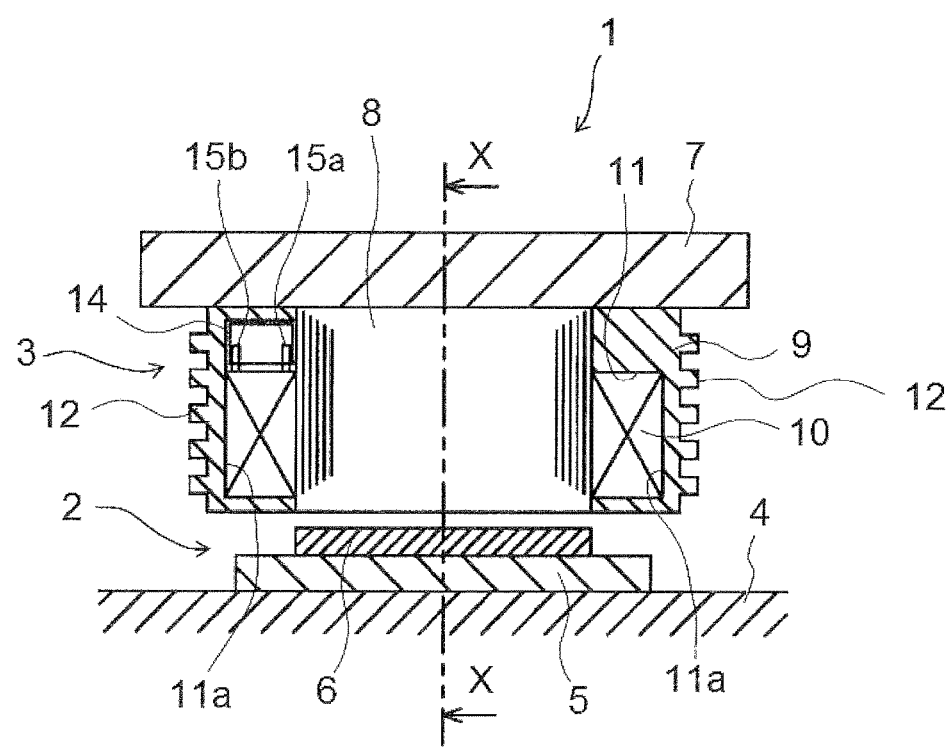

[FIG.2]
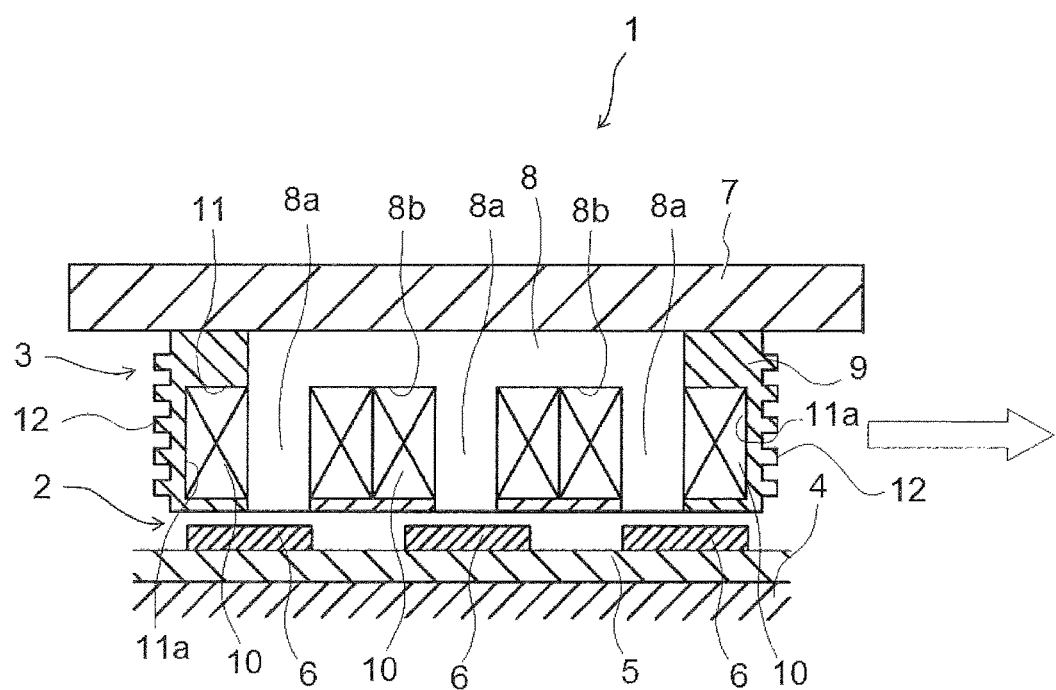

[FIG.3A]
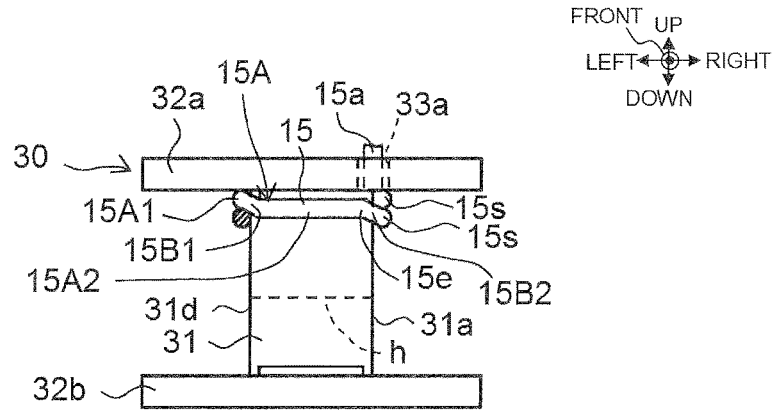
[FIG.3B]
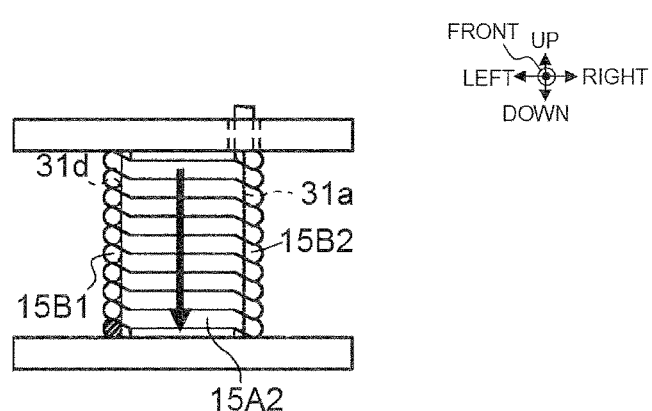
[FIG.3C]
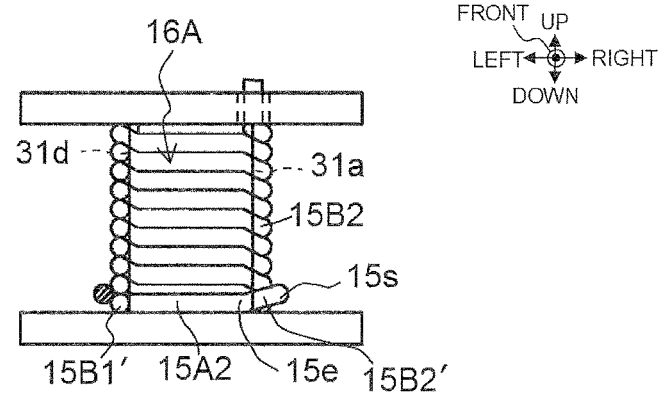

[FIG.3D]
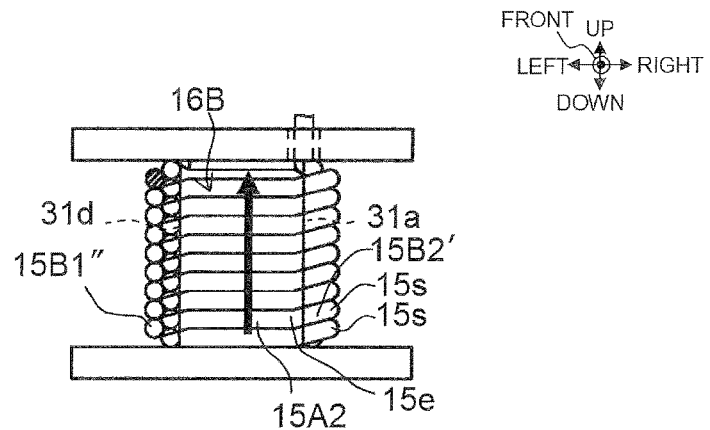
[FIG.3E]
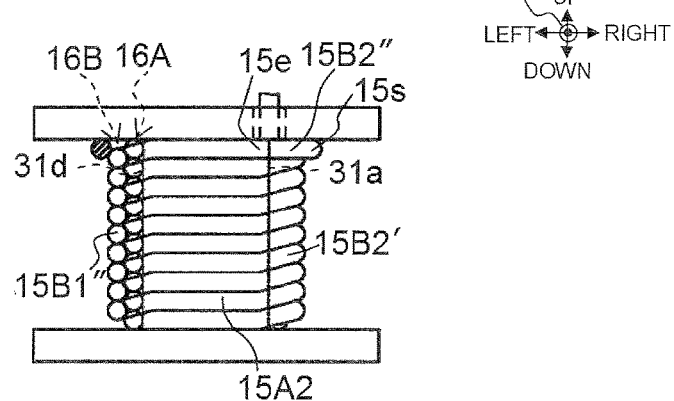
[FIG.3F]
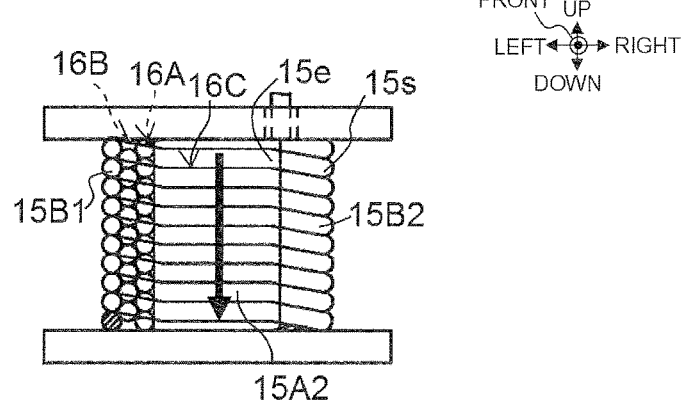

[FIG.3G]
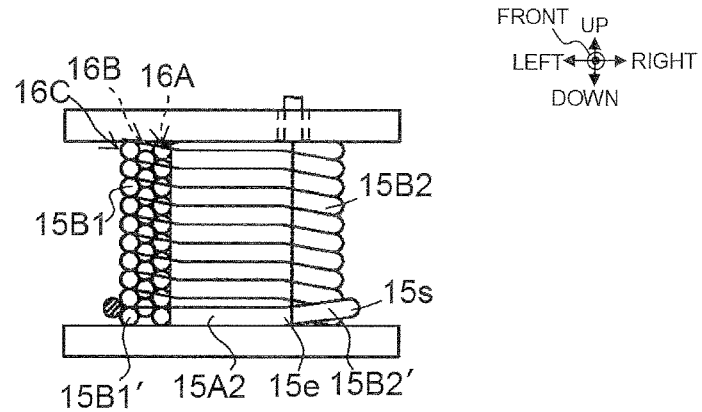
[FIG.3H]
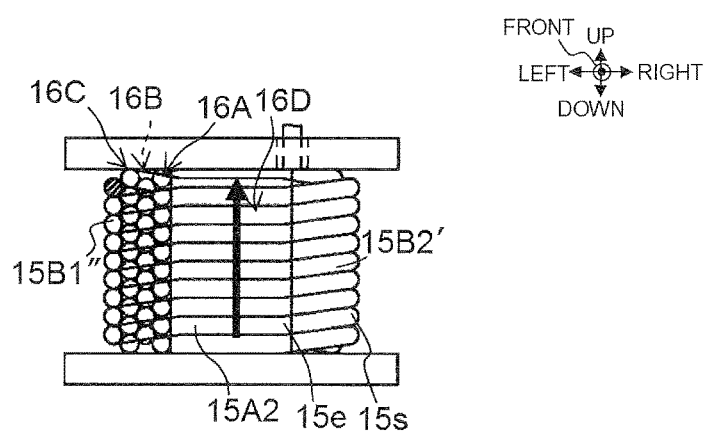
[FIG.3I]
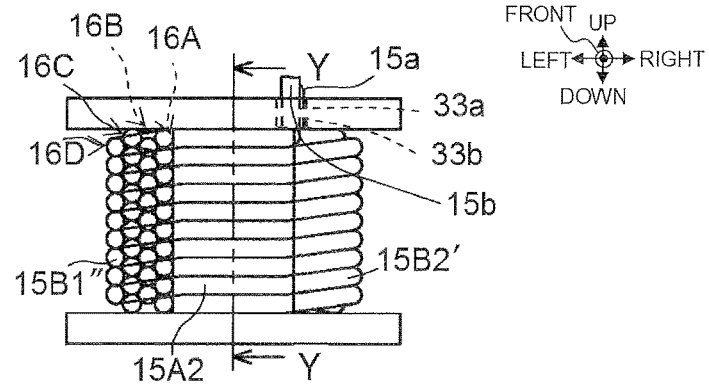

[FIG.3J]
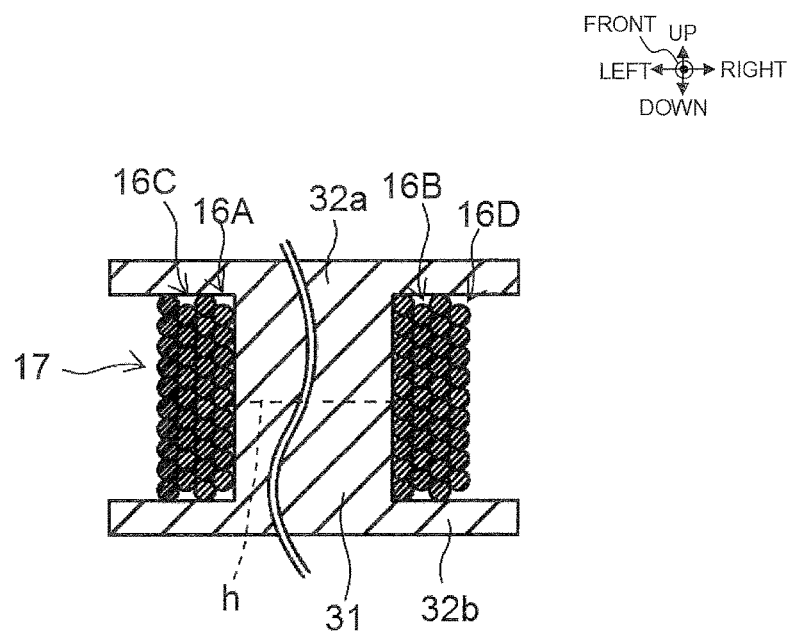
[FIG.3K]
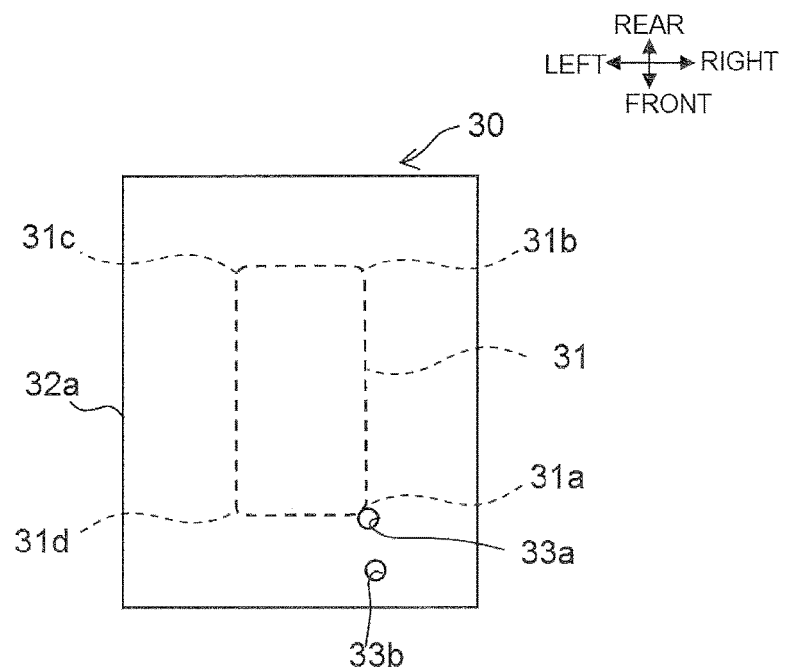

[FIG.4A]
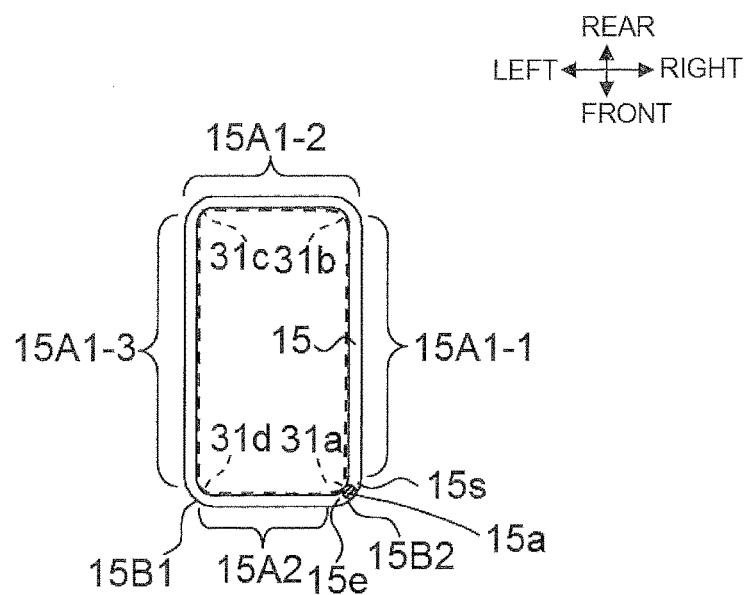
[FIG.4B]
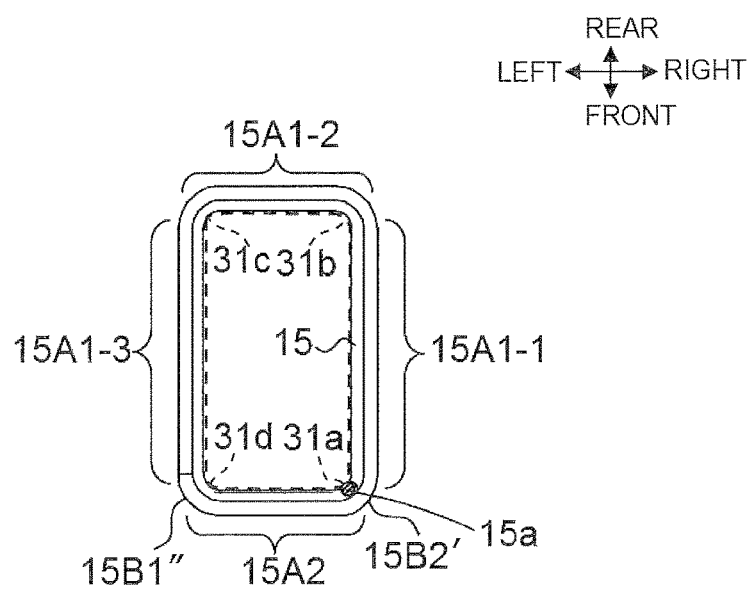

[FIG.4C]
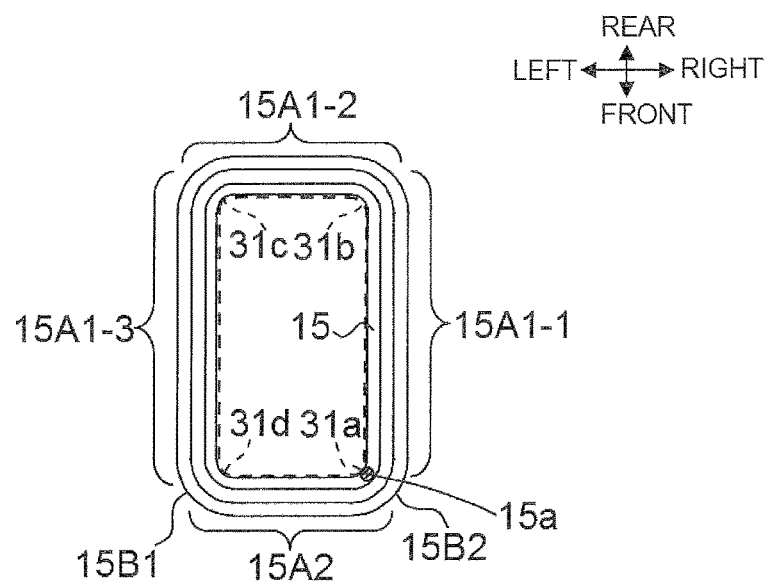
[FIG.4D]
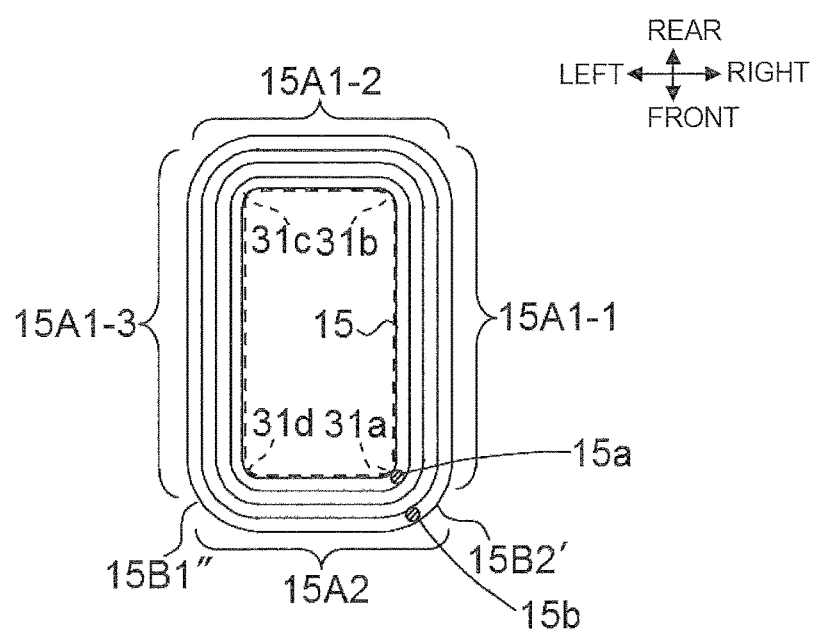

[FIG.5A]
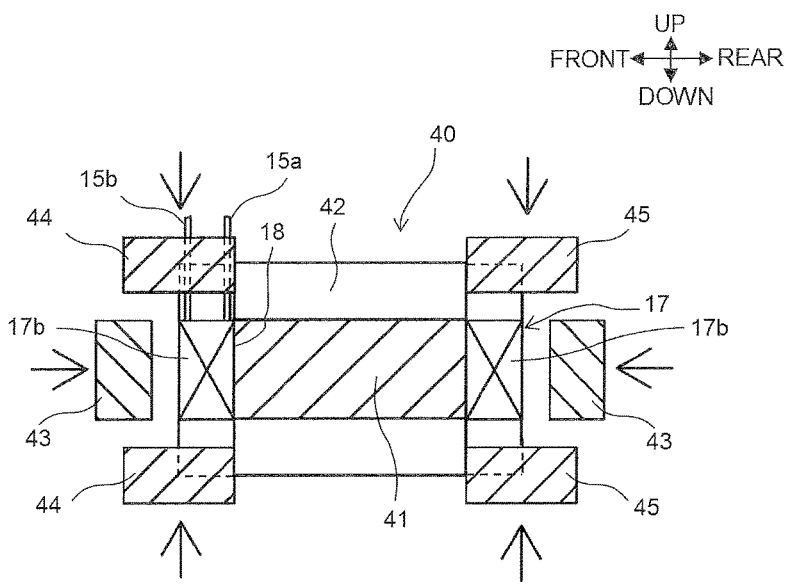
[FIG.5B]
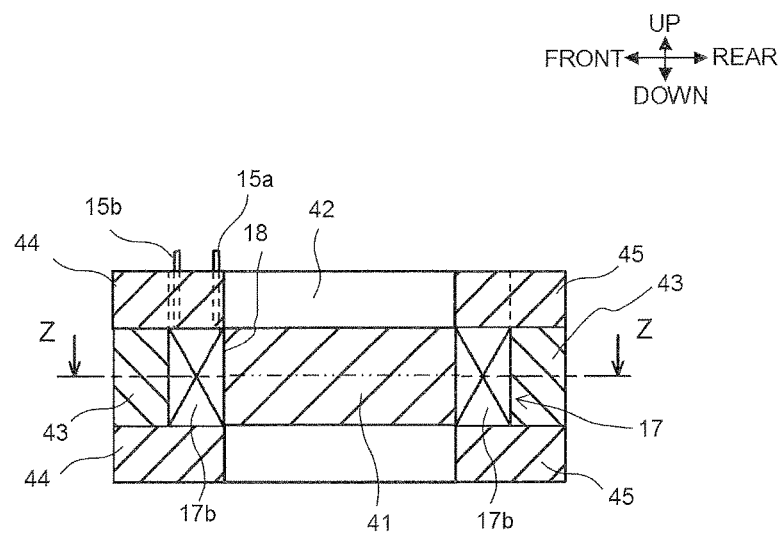

[FIG.5C]
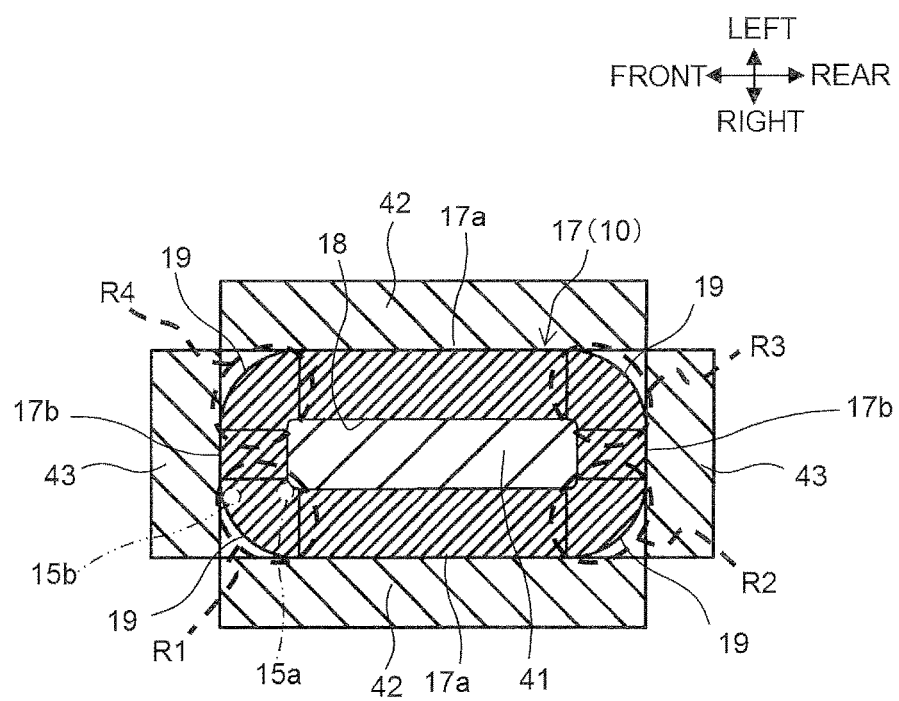

[FIG.6A]
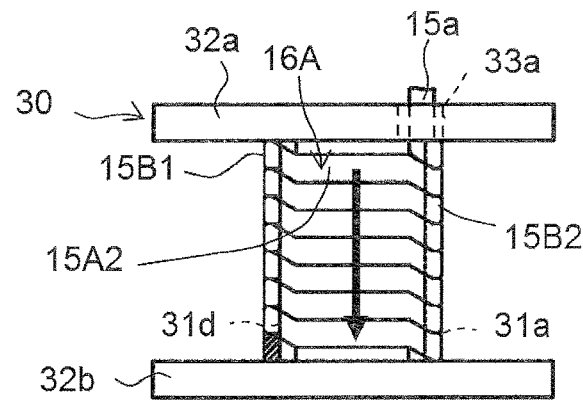
[FIG.6B]
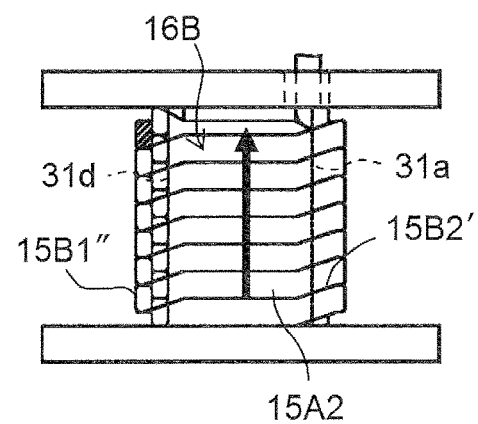
[FIG.6C]
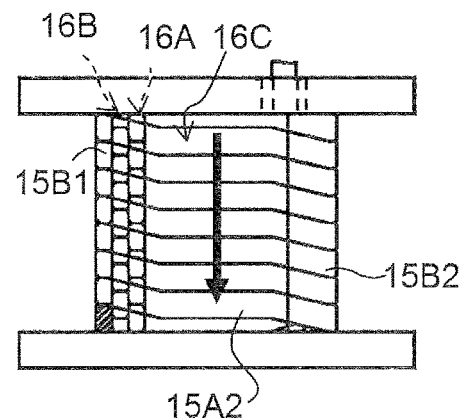

[FIG.6D]
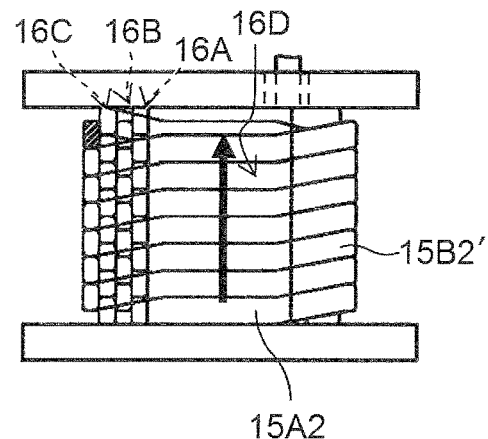
[FIG.6E]
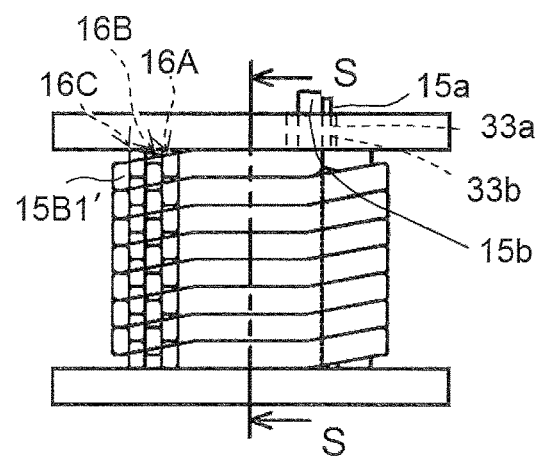
[FIG.6F]
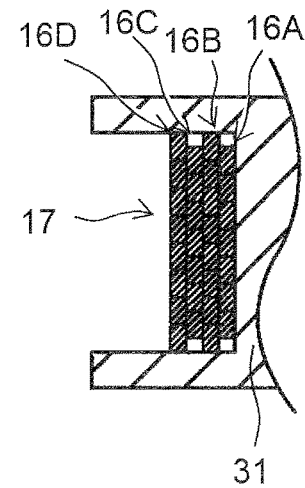

[FIG.7]
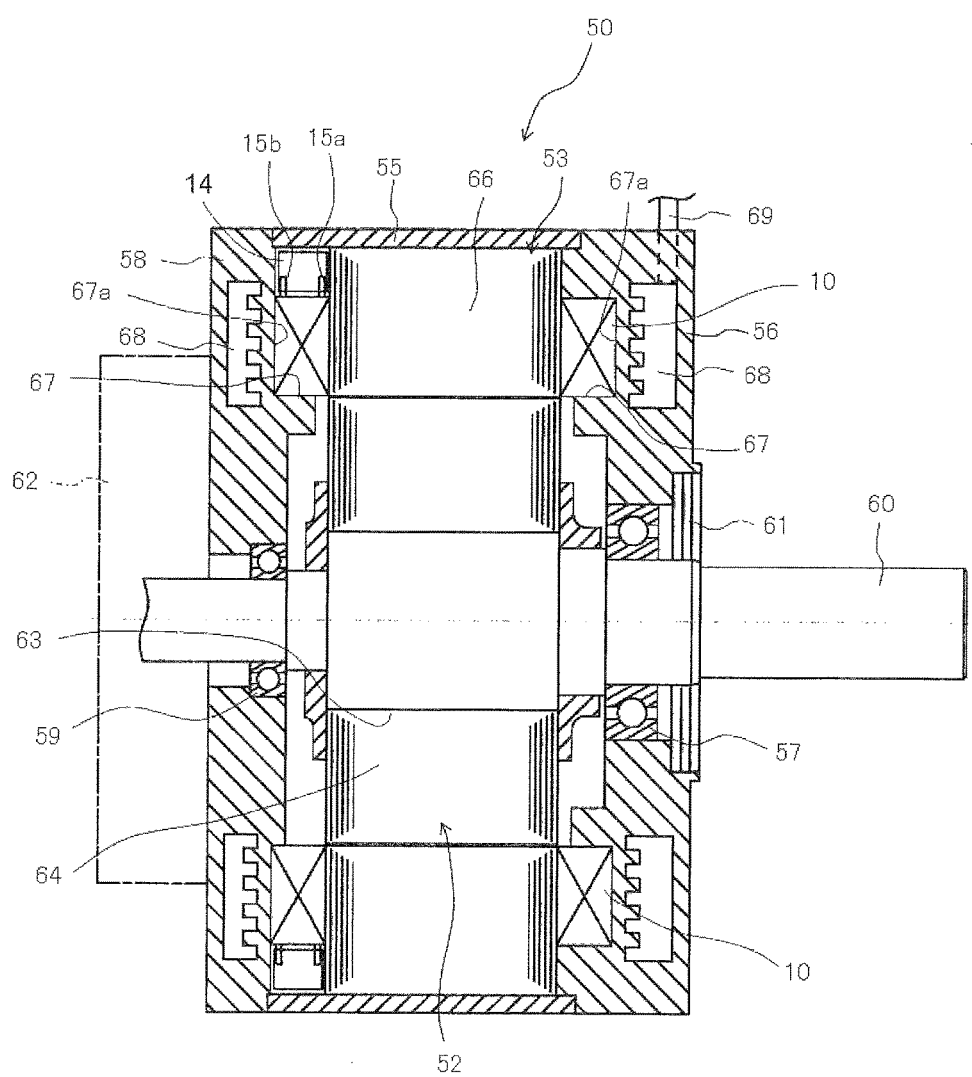

US 9,978,492 B2

COIL, ROTATING ELECTRICAL MACHINE, AND LINEAR MOTOR

CROSS-REFERENCE TO RELATED APPLICATION

This is a continuation application PCT/JP2012/075156, filed Sep. 28, 2012, which was published under PCT article 21(2) in English.

TECHNICAL FIELD

The present embodiment disclosed herein relates to a coil, a rotating electrical machine, and a linear motor.

BACKGROUND

A rectangular coil having four straight sides, which is obtained by bending and winding a conductor (rectangular wire material) having a rectangular traverse cross section is known.

SUMMARY

According to one aspect of the disclosure, there is provided a coil including a plurality of wound parts formed by winding a conductor by one turn approximately along a predetermined circumferential direction from a starting point to an ending point. The plurality of wound parts are arranged along a first direction perpendicular to the circumferential direction. An outer shape of the coil as viewed from the first direction has an approximately rectangular shape or an approximately square shape with four corner parts. The coil includes at least one parallel part extended parallelly along the circumferential direction, and at least one connecting part arranged at a portion corresponding to any of the four corner parts, the at least one connecting part being extended along a diagonal direction with respect to the circumferential direction to connect the two parallel parts.

BRIEF DESCRIPTION OF THE DRAWINGS

FIG. 1 is a schematic view illustrating a traverse cross section of a configuration of a linear motor according to a first embodiment.

FIG. 2 is a longitudinal sectional view taken along an X-X cross section in FIG. 1.

FIGS. 3A to 3K are explanatory views for explaining a winding step for a coil provided to a linear motor, a transverse sectional view taken along a Y-Y cross section, and a plan view of a winding jig.

FIGS. 4A to 4D are perspective views schematically illustrating a winding jig when viewed from the upper side of an upper spacer part.

FIGS. 5A to 5C are sectional side views for explaining a step of forming the outer shape of a coil, and a horizontal sectional view taken along a Z-Z cross section.

FIGS. 6A to 6F are explanatory views for explaining a winding step for a coil according to a modification example employing a rectangular wire, and a transverse sectional view taken along an S-S cross section.

FIG. 7 is a longitudinal sectional view schematically illustrating a configuration of a rotating electrical machine according to a second embodiment.

DESCRIPTION OF THE EMBODIMENTS

Hereinbelow, embodiments disclosed will be described with reference to the drawings.

<First Embodiment>

First, a linear motor according to a first embodiment will be described with reference to FIG. 1 and FIG. 2.

<Configuration of Linear Motor>

As illustrated in FIG. 1 and FIG. 2, a linear motor 1 according to this embodiment includes a field system 2 constituting a stator, and an armature 3 constituting a mover. The field system 2 includes a field yoke 5 secured to a yoke attachment part 4, and plural permanent magnets 6 arranged on the field yoke 5. The plural permanent magnets 6 are arranged adjacently to each other at an equal pitch along the longitudinal direction of the field yoke 5 (direction in which the armature 3 moves) such that opposing magnetic poles are alternately arranged.

The armature 3 is arranged so as to face the permanent magnets 6 of the field system 2 in parallel via a magnetic gap. This armature 3 includes an armature base 7, a core 8, a bracket 9 secured to the armature base 7 so as to surround the core 8, and plural coils 10 (three pieces in this example) in which three coils 10 form one set.

The core 8 is secured on a surface of the armature base 7 that faces the field system 2, and includes a laminated body obtained by punching out an electromagnetic steel sheet into a comb-teeth shape and laminating it. Furthermore, the core 8 has plural teeth 8a (three teeth in this example) each protruding toward the field system 2. The teeth 8a are disposed at equal intervals in the longitudinal direction (in the left-right direction in FIG. 2) of the armature 3.

The coils 10 are loaded to the core 8, and are accommodated and arranged so as to be brought into approximately close contact with the bracket 9. More specifically, each of the coils 10 is accommodated in a slot 8b formed between adjacent teeth 8a in a state where a hole part 18 (see FIG. 5C described later) provided on the inner peripheral side of the coil 10 is fitted with the teeth 8a. At this time, the outer peripheral part (straight part 17a or 17b, details of which will be described later) of a part of the coil 10 exposed from the core 8 is secured to the bracket 9 in a state where this outer peripheral part is brought into contact with an inner surface 11a of a recessed part 11 of the bracket 9. Note that the bracket 9 has cooling fins 12 formed on the outer peripheral surface thereof.

At one end part (left side in FIG. 1) of the armature 3 in the widthwise direction, a wire connection part 14 is provided between the coil 10 and the armature base 7. Each of the coils 10 has a first protruding part 15a and a second protruding part 15b of a conductor 15 formed thereon, which protrude from the coil 10 and are provided on a winding start side and a winding end side of the conductor 15 (see FIGS. 3A to 3K described later) as described later. The wire connection part 14 connects the first protruding part 15a and the second protruding part 15b of the coil 10, and is connected with an external power source, which is not illustrated. In the linear motor 1, three-phase alternating current having phases corresponding to a U phase, a V phase, and a W phase is supplied to each of the coils 10 from the external power source through the wire connection part 14 and the first and the second protruding parts 15a, 15b, which causes a magnetic filed of the coil 10. As a result, repelling force and attracting force act between the coil 10 and the permanent magnets 6 of the field system 2, generating propelling force to the armature 3. With this operation, the armature 3 travels along a travelling direction indicated by the white arrow in the drawing.

<Feature of this Embodiment>

In connection with the linear motor 1 having the configuration described above, a feature of this embodiment lies in a method of winding the conductor 15 (see, for example, FIGS. 3A to 3K described later) to make the surface of the coil 10 smooth. Below, details thereof will be described sequentially. The coil 10 is generally manufactured through a first step of winding the conductor 15 in a circumferential direction, and a second step of pressure molding a predetermined portion of an unmolded coil 17 (see, for example, FIGS. 4A to 4D described later) obtained through the first step.

<Outline of First Step>

Subsequently, the first step will be described with reference to FIGS. 3A to 3K and FIGS. 4A to 4D. Note that, in the following description, the vertical direction (height direction), the front-rear direction, and the left-right direction correspond to directions of the arrows illustrated as appropriate in the drawings including, for example, FIGS. 3A to 3J, FIG. 3K, and FIGS. 4A to 4D. In the first step, the conductor 15 is repeatedly wound in the circumferential direction along a approximately horizontal direction, thereby forming plural conductor cylinder parts 16 (which will be described later) laminated in the radial direction. The conductor 15 is formed by a round copper wire of a bonding line coated with a resin having an electrical insulation property and a thermal fusion property.

<Winding Jig>

At the time of winding the conductor 15, a winding jig 30 arranged in a predetermined posture is used. This winding jig 30 includes a approximately cuboid-shaped core pin part 31 having a horizontal cross section with a approximately rectangle shape in this example. This core pin part 31 has a coupling structure, not illustrated, as appropriate, and can be separated into two parts, which are the upper part and the lower part, at a approximately half position (see the dotted line h in FIG. 3A and FIG. 3J) in the height direction. An upper spacer part 32a is integrally provided on an upper end part of the upper half of the separated core pin part 31, and a lower spacer part 32b is integrally provided on a lower end part of the lower half of the core pin part 31. Note that the upper spacer part 32a has through-holes 33a and 33b that allow the conductor 15 to pass through as illustrated in FIG. 3K. The through-holes 33a and 33b are provided on a position close to one corner part of four corner parts 31a, 31b, 31c, and 31d of the core pin part 31 (at the first corner part 31a on the right front side in this example), and at a position on the outer side of this position in the radial direction, respectively.

<Formation of First Wound Part>

First, the conductor 15 is caused to protrude upward by a predetermined amount from the through-hole 33a of the upper spacer part 32a as illustrated in FIG. 3A, to form a first protruding part 15a. Subsequently, in the vicinity of the lower surface of the upper spacer part 32a, a part of the conductor 15 following the first protruding part 15a is wound by one turn around the core pin part 31 with the starting point 15s for winding being the first corner part 31a located on the right front side of the core pin part 31 in the order of the first corner part 31a, the second corner part 31b located on the right rear side, the third corner part 31c located on the left rear side, the fourth corner part 31d on the left front side, and the first corner part 31a located on the right front side.

More specifically, as illustrated in FIG. 4A and FIG. 3A, the conductor 15 is caused to extend along the horizontal direction (corresponding to an example of a circumferential direction) from the starting point 15s located at the first corner part 31a on the right front side toward the second corner part 31b on the right rear side (extension part 15A1-1). Then, the conductor 15 is caused to extend along the horizontal direction from the second corner part 31b toward the third corner part 31c on the left rear side (extension part 15A1-2). Then, the conductor 15 is caused to extend along the horizontal direction from the third corner part 31c toward the fourth corner part 31d on the left front side (extension part 15A1-3). With these operations, it is possible to form a first parallel part 15A1 including the three extension parts 15A1-1, 15A-2, and 15A-3 on the same pitch as the starting point 15s (in other words, located at the same position in the vertical direction as the starting point s).

Subsequently, at the fourth corner part 31d, the conductor 15 is caused to extend along a diagonal direction with respect to the horizontal direction so as to be shifted downward by a half pitch of the winding pitch of the conductor 15 (hereinafter, simply referred to as "half pitch" as appropriate the half pitch is almost equal to a half value of the wire diameter of the conductor 15) along the vertical direction (which is equal to a so-called axial direction and corresponds to an example of a first direction) from the first parallel part 15A1. With this arrangement, there is formed a first connecting part 15B1 (a so-called stepped part) that connects the first parallel part 15A1 and a second parallel part 15A2, which will be described later). Subsequently, the conductor 15 is caused to extend along the horizontal direction toward an ending point 15e located at the first corner part 31a to form the second parallel part 15A2, which is shifted downward by the half pitch from the starting point 15s.

Subsequently, at the first corner part 31a, the conductor 15 that has reached the first corner part 31a is caused to extend along a diagonal direction with respect to the horizontal direction so as to be shifted downward by the half pitch from the second parallel part 15A2. With this arrangement, there is formed a second connecting part 15B2 (a so-called stepped part) that connects the ending point 15e located at the end of the second parallel part 15A2 of the first wound part 15A with the starting point 15s of the next second wound part 15A of which winding starts from the first corner part 31a in a similar manner. With these operations, the first wound part 15A including the first parallel part 15A1, the first connecting part 15B1, the second parallel part 15A2, and the second connecting part 15B2 is completed (see FIG. 4A).

<Formation of Second and Subsequent Wound Parts>

Subsequently, similarly, the second wound part 15A is formed. More specifically, the conductor 15 is caused to extend along the horizontal direction from a starting point 15s shifted downward at the first corner part 31a by one pitch from the starting point 15s of the first wound part 15A, this extension being performed in the order of the second corner part 31b, the third corner part 31c, and the fourth corner part 31d, thereby forming a first parallel part 15A1 including the extension parts 15A1-1, 15A1-2, and 15A1-3. Then, similarly to that described above, through the first connecting part 15B1 extending along a diagonal direction at the fourth corner part 31d, there is formed a second parallel part 15A2 extending along the horizontal direction toward the ending point 15e located at the first corner part 31a. Subsequently, at the first corner part 31a, the second connecting part 15B2 extending along a diagonal direction connects the second parallel part 15A2 with the next third wound part 15A. With the arrangement described above, the second wound part 15A including the first parallel part 15A1, the first connecting part 15B1, the second parallel part 15A2, and the second connecting part 15B2 is completed. At this time, the first parallel part 15A1, the first connecting part 15B1, the second parallel part 15A2, and the second connecting part 15B2 of the second wound part 15A are shifted downward by one pitch from the first parallel part 15A1, the first connecting part 15B1, the second parallel part 15A2, and the second connecting part 15B2 of the first wound part 15A, respectively.

In the following, similarly, the conductor 15 is wound by one turn approximately along the circumferential direction while being shifted downward by one pitch along the vertical direction to thereby sequentially generate other wound parts 15A adjacent downward such as a third wound part 15A, a fourth wound part 15A, . . . (see FIG. 3B). As described above, between the upper spacer part 32a and the lower spacer part 32b of the core pin part 31, the wound parts 15A are sequentially generated up to the wound part 15A on the lowest row that reaches the lower spacer part 32b.

<Completion of First Conductor Cylinder Part with Formation of Wound Part on Lowest Row>

In the wound part 15A on the lowest row, the first parallel part 15A1 including the extension parts 15A1-1, 15A1-2, and 15A1-3 is configured similarly to that in the wound parts 15A at other rows described above. However, a first connecting part 15B1', the second parallel part 15A2, and a second connecting part 15B2' differ from the wound parts 15A at other rows in terms of winding modes.

More specifically, at the fourth corner part 31d, the conductor 15 is caused to extend at the same vertical position as the first parallel part 15A1 (the same pitch) while being expanded in the horizontal direction so as to be shifted externally by a little less than one pitch (a value a little less than the value of the wire diameter of the conductor 15) along the radial direction (corresponding to an example of a second direction) perpendicular to the vertical direction. With this configuration, there is formed a first connecting part 15B 1' (a so-called stepped part) that connects the first parallel part 15A1 with a second parallel part 15A2, which will be described later. Subsequently, with respect to a circumferential position shifted externally in the radial direction as described above, the conductor 15 is caused to extend along the horizontal direction toward the ending point 15e located in the vicinity of the first corner part 31a to thereby form the second parallel part 15A2 located at the same vertical position (the same pitch) as the starting point 15s of this wound part 15A on the lowest row (see FIG. 3C).

Subsequently, at the first corner part 31a, the conductor 15 that has reached the first corner part 31a is caused to extend along a diagonal direction with respect to the horizontal direction so as to be shifted upward by the half pitch from the second parallel part 15A2. With this arrangement, there is formed a second connecting part 15B2' (a so-called stepped part) that connects the ending point 15e located at the end of the second parallel part 15A2 of the wound part 15A on the lowest row, with the starting point 15s of the next wound part 15A (the wound part 15A on the lowest row corresponding to the first wound part in a second conductor cylinder part 16B that will be described later) of which winding starts from the first corner part 31a similarly to the above. With these operations, the wound part 15A on the lowest row including the first parallel part 15A1, the first connecting part 15B1', the second parallel part 15A2, and the second connecting part 15B2' is completed.

As a result, there is formed a first conductor cylinder part 16A (corresponding to a conductor cylinder part located on the innermost peripheral side) including plural wound parts 15A arranged along the vertical direction from the highest row to the lowest row (see FIG. 3C).

<Formation of First Wound Part of Second Conductor Cylinder Part>

After the first conductor cylinder part 16A is formed, the next second conductor cylinder part 16B is formed on the outer peripheral side of the first conductor cylinder part 16A in the radial direction through the method of winding a conductor similar to that described above (forming the conductor cylinder part while shifting the wound part 15A upward in a sequential manner). More specifically, the second connecting part 15B2' of the wound part 15A on the lowest row of the first conductor cylinder part 16A is connected with a starting point 15s of the wound part 15A located on the lowest row (the first row from the bottom) of the second conductor cylinder part 16B. In this first wound part 15A, the conductor 15 is caused to extend from the starting point 15s located in the vicinity of the first corner part 31a toward the vicinity of the second corner part 31b similarly to the above (extension part 15A1-1). Then, the conductor 15 is caused to extend toward the vicinity of the third corner part 31c (extension part 15A1-2). Furthermore, the conductor 15 is caused to extend toward the vicinity of the fourth corner part 31d (extension part 15A1-3), whereby the first parallel part 15A1 located on the same pitch as the starting point 15s is formed.

Subsequently, in the vicinity of the fourth corner part 31d, the conductor 15 is caused to extend along a diagonal direction so as to be shifted upward by the half pitch from the first parallel part 15A1. With this operation, there is formed a first connecting part 15B1" (a so-called stepped part) that connects the first parallel part 15A1 with a second parallel part 15A2, which will be described later. Subsequently, the conductor 15 is caused to extend along the horizontal direction toward the ending point 15e located in the vicinity of the first corner part 31a. With this operation, there is formed a second parallel part 15A2 of the first wound part 15A of the second conductor cylinder part 16B located being shifted upward by the half pitch from the starting point 15s (see FIG. 3C) of the first wound part 15A described above (see FIG. 3D).

Subsequently, in the vicinity of the first corner part 31a, the conductor 15 that has arrived is caused to extend along a diagonal direction with respect to the horizontal direction so as to be shifted upward by the half pitch from the second parallel part 15A2. With this operation, there is formed a second connecting part 15B2' (a so-called stepped part) that connects the ending point 15e located at the end of the second parallel part 15A2 of the first wound part 15A with the starting point 15s of the next second wound part 15A (the second row from the bottom) of which winding starts from the vicinity of the first corner part 31a similarly to the above. With these operations, there is completed the first wound part 15A of the second conductor cylinder part 16B including the first parallel part 15A1, the first connecting part 15B1", the second parallel part 15A2, and the second connecting part 15B2' (see FIG. 4B).

<Formation of Second and Subsequent Wound Parts>

Subsequently, similarly to the above, the second wound part 15A of the second conductor cylinder part 16B is formed. More specifically, the conductor 15 is caused to extend along the horizontal direction from the starting point 15s of the second wound part 15A shifted upward by one pitch from the starting point 15s of the first wound part 15A in the vicinity of the first corner part 31a, the extension being performed in the order of the vicinity of the second corner part 31b, the vicinity of the third corner part 31c, and the vicinity of the fourth corner part 31d to thereby form a first parallel part 15A1 including the extension parts 15A1-1, 15A1-2, and 15A1-3. Then, similarly to the above, there is formed a second parallel part 15A2 that extends along the horizontal direction toward the ending point 15e located in the vicinity of the first corner part 31a through the first connecting part 15B1" extending along a diagonal direction in the vicinity of the fourth corner part 31d. Subsequently, in the vicinity of the first corner part 31a, the second connecting part 15B2' extending along a diagonal direction connects the second parallel part 15A2 with the next third wound part 15A (the third part from the bottom). With these operations, there is completed a second wound part 15A including the first parallel part 15A1, the first connecting part 15B1", the second parallel part 15A2, and the second connecting part 15B2'. At this time, the first parallel part 15A1, the first connecting part 15B1", the second parallel part 15A2, and the second connecting part 15B2' of the second wound part 15A are shifted upward by one pitch from the first parallel part 15A1, the first connecting part 15B1", the second parallel part 15A2, and the second connecting part 15B2' of the first wound part 15A, respectively.

Similarly to the above, the conductor 15 is wound by one turn approximately along the circumferential direction while being shifted upward by one pitch along the vertical direction to thereby sequentially generate other wound parts 15A adjacent upward such as the third wound part 15A from the bottom, the fourth wound part 15A from the bottom, . . . (see FIG. 3E). As described above, between the lower spacer part 32b and the upper spacer part 32a of the core pin part 31, the wound parts 15A are sequentially generated up to the wound part 15A on the highest row that reaches the upper spacer part 32a.

<Completion of Second Conductor Cylinder Part with Formation of Wound Part on Highest Row>

In the wound part 15A on the highest row, the first parallel part 15A1, the first connecting part 15B1", and the second parallel part 15A2 are configured similarly to those in the wound parts 15A on the other rows described above. However, the winding mode differs between the second connecting part 15B2" and that in other wound parts 15A on other rows.

More specifically, in the vicinity of the first corner part 31a, the conductor 15 is caused to extend at the same vertical position (the same pitch) as the second parallel part 15A2 while being expanded in the horizontal direction so as to be shifted externally by a little less than one pitch (a value a little less than the value of the wire diameter of the conductor 15) along the radial direction. With this configuration, there is formed a second connecting part 15B2" (a so-called stepped part) that connects the second parallel part 15A2 with a first parallel part 15A1, which will be described later. Furthermore, the ending point 15e located at the end of the second parallel part 15A2 of the wound part 15A on the highest row is connected through the second connecting part 15B" with the starting point 15s of the next wound part 15A (the wound part 15A on the highest row corresponding to the first wound part of a third conductor cylinder part 16C, which will be described later) of which winding starts from the first corner part 31a in a similar manner. As a result, there is completed the wound part 15A on the highest row including the first parallel part 15A1, the first connecting part 15B1, the second parallel part 15A2, and the second connecting part 15B2".

As a result, there is formed a second conductor cylinder part 16B including the plural wound parts 15A arranged along the vertical direction from the lowest row to the highest row (see FIG. 3E).

<Formation of First Wound Part of Third Conductor Cylinder Part>

After the second conductor cylinder part 16B is formed, the next third conductor cylinder part 16C is formed on the outer peripheral side of the second conductor cylinder part 16B in the radial direction through the method of winding a conductor similar to that described above (the third conductor cylinder part 16C is formed while the wound part 15A is being shifted downward in a sequential manner). More specifically, the second connecting part 15B2" of the wound part 15A on the highest row of the second conductor cylinder part 16B is connected with a starting point 15s of the wound part 15A located on the highest row (the first row from the top) of the third conductor cylinder part 16C. In this first wound part 15A, the conductor 15 is caused to extend from the starting point 15s located in the vicinity of the first corner part 31a toward the vicinity of the second corner part 31b similarly to the above (extension part 15A1-1). Then, the conductor 15 is caused to extend toward the vicinity of the third corner part 31c (extension part 15A1-2). Furthermore, the conductor 15 is caused to extend toward the vicinity of the fourth corner part 31d (extension part 15A1-3), whereby the first parallel part 15A1 located on the same pitch as the starting point 15s is formed.

Subsequently, in the vicinity of the fourth corner part 31d, the conductor 15 is caused to extend along a diagonal direction so as to be shifted downward by the half pitch from the first parallel part 15A1. With this operation, there is formed a first connecting part 15B1 (a so-called stepped part) that connects the first parallel part 15A1 with a second parallel part 15A2, which will be described later. Subsequently, the conductor 15 is caused to extend along the horizontal direction toward the ending point 15e located in the vicinity of the first corner part 31a. With this operation, there is formed the second parallel part 15A2 of the first wound part 15A of the third conductor cylinder part 16C located being shifted downward by the half pitch from the starting point 15s described above (see FIG. 3E) of the first wound part 15A (see FIG. 3F).

Subsequently, in the vicinity of the first corner part 31a, the conductor 15 that has arrived is caused to extend along a diagonal direction with respect to the horizontal direction so as to be shifted downward by the half pitch from the second parallel part 15A2. With this operation, there is formed a second connecting part 15B2 (a so-called stepped part) that connects the ending point 15e located at the end of the second parallel part 15A2 of the first wound part 15A with the starting point 15s of the next second wound part 15A (the second row from the bottom) of which winding starts from the vicinity of the first corner part 31a similarly to the above. With these operations, there is completed the first wound part 15A of the third conductor cylinder part 16C including the first parallel part 15A1, the first connecting part 15B1, the second parallel part 15A2, and the second connecting part 15B2 (see FIG. 4C).

<Formation of Second and Subsequent Wound Parts>

Subsequently, similarly to the above, the second wound part 15A of the third conductor cylinder part 16C is formed. More specifically, the conductor 15 is caused to extend along the horizontal direction from the starting point 15s located being shifted downward by one pitch from the starting point 15s of the first wound part 15A in the vicinity of the first corner part 31a, the extension being performed in the order of the vicinity of the second corner part 31b, the vicinity of the third corner part 31c, and the vicinity of the fourth corner part 31d to thereby form a first parallel part 15A1 including the extension parts 15A1-1, 15A1-2, and 15A1-3. Subsequently, similarly to the above, there is formed a second parallel part 15A2 that extends along the horizontal direction toward the ending point 15e located in the vicinity of the first corner part 31a through the first connecting part 15B1 extending along a diagonal direction in the vicinity of the fourth corner part 31d. Subsequently, in the vicinity of the first corner part 31a, the second connecting part 15B2 extending along a diagonal direction connects the second parallel part 15A2 with the next third wound part 15A (the third part from the top). With these operations, there is completed the second wound part 15A including the first parallel part 15A1, the first connecting part 15B1, the second parallel part 15A2, and the second connecting part 15B2. At this time, the first parallel part 15A1, the first connecting part 15B1, the second parallel part 15A2, and the second connecting part 15B2 of the second wound part 15A are shifted downward by one pitch from the first parallel part 15A1, the first connecting part 15B1, the second parallel part 15A2, and the second connecting part 15B2 of the first wound part 15A, respectively.

Similarly to the above, the conductor 15 is wound by one turn approximately along the circumferential direction while being shifted downward by one pitch along the vertical direction to thereby sequentially generate other wound parts 15A adjacent downward such as the third wound part 15A from the top, the fourth wound part 15A from the top, . . . (see FIG. 3F). As described above, between the upper spacer part 32a and the lower spacer part 32b of the core pin part 31, the wound parts 15A are sequentially generated up to the wound part 15A on the lowest row that reaches the lower spacer part 32b.

<Completion of Third Conductor Cylinder Part with Formation of Wound Part on Lowest Row>

In the wound part 15A on the lowest row, the first parallel part 15A1 is configured similarly to each of the wound parts 15A on the other rows described above. However, the first connecting part 15B1', the second parallel part 15A2, and the second connecting part 15B2' differ in the winding mode from those in other wound parts 15A on other rows.

More specifically, at the fourth corner part 31d, the conductor 15 is caused to extend at the same vertical position (the same pitch) as the first parallel part 15A1 while being expanded in the horizontal direction so as to be shifted externally by a little less than one pitch along the radial direction perpendicular to the vertical direction. With this configuration, there is formed a first connecting part 15B 1' (a so-called stepped part) that connects the first parallel part 15A1 with a second parallel part 15A2, which will be described later. Subsequently, at the winding position shifted externally in the radial direction as described above, the conductor 15 is caused to extend along the horizontal direction toward the ending point 15e located in the vicinity of the first corner part 31a to thereby kiln' the second parallel part 15A2 located at the same vertical position (the same pitch) as the starting point 15s of the wound part 15A on the lowest row (see FIG. 3G).

Subsequently, at the first corner part 31a, the conductor 15 that has reached the first corner part 31a is caused to extend along a diagonal direction with respect to the horizontal direction so as to be shifted upward by the half pitch from the second parallel part 15A2. With this arrangement, there is formed a second connecting part 15B2' (a so-called stepped part) that connects the ending point 15e located at the end of the second parallel part 15A2 of the wound part 15A on the lowest row, with the starting point 15s of the next wound part 15A (the wound part 15A on the lowest row corresponding to the first wound part in a fourth conductor cylinder part 16D that will be described later) of which winding starts from the first corner part 31a similarly to the above. With these operations, the wound part 15A on the lowest row including the first parallel part 15A1, the first connecting part 15B1', the second parallel part 15A2, and the second connecting part 15B2' is completed.

As a result, there is formed the third conductor cylinder part 16C including plural wound parts 15A arranged along the vertical direction from the highest row to the lowest row (see FIG. 3G).

<Formation of First Wound Part of Fourth Conductor Cylinder Part>

After the third conductor cylinder part 16C is formed, the next fourth conductor cylinder part 16D is formed on the outer peripheral side of the third conductor cylinder part 16C in the radial direction through the method of winding a conductor similar to that described above (forming the conductor cylinder part while shifting the wound part 15A upward in a sequential manner). More specifically, the second connecting part 15B2' of the wound part 15A on the lowest row of the third conductor cylinder part 16C is connected with a starting point 15s of the wound part 15A located on the lowest row (the first row from the bottom) of the fourth conductor cylinder part 16D. In this first wound part 15A, the conductor 15 is caused to extend from the starting point 15s located in the vicinity of the first corner part 31a toward the vicinity of the second corner part 31b similarly to the above (extension part 15A1-1). Then, the conductor 15 is caused to extend toward the vicinity of the third corner part 31c (extension part 15A1-2). Furthermore, the conductor 15 is caused to extend toward the vicinity of the fourth corner part 31d (extension part 15A1-3), whereby the first parallel part 15A1 located on the same pitch as the starting point 15s is formed.

Subsequently, in the vicinity of the fourth corner part 31d, the conductor 15 is caused to extend along a diagonal direction so as to be shifted upward by the half pitch from the first parallel part 15A1. With this operation, there is formed a first connecting part 15B1" (a so-called stepped part) that connects the first parallel part 15A1 with a second parallel part 15A2, which will be described later. Subsequently, the conductor 15 is caused to extend along the horizontal direction toward the ending point 15e located in the vicinity of the first corner part 31a. With this operation, there is formed the second parallel part 15A2 of the first wound part 15A of the fourth conductor cylinder part 16D located being shifted upward by the half pitch from the starting point 15s described above (see FIG. 3G) of the first wound part 15A (see FIG. 3H).

Subsequently, in the vicinity of the first corner part 31a, the conductor 15 that has arrived is caused to extend along a diagonal direction with respect to the horizontal direction so as to be shifted upward by the half pitch from the second parallel part 15A2. With this operation, there is formed a second connecting part 15B2' (a so-called stepped part) that connects the ending point 15e located at the end of the second parallel part 15A2 of the first wound part 15A with the starting point 15s of the next second wound part 15A (the second row from the bottom) of which winding starts from the vicinity of the first corner part 31a similarly to the above. With these operations, there is completed the first wound part 15A of the fourth conductor cylinder part 16D including the first parallel part 15A1, the first connecting part 15B1", the second parallel part 15A2, and the second connecting part 15B2' (see FIG. 4D).

<Formation of Second and Subsequent Wound Parts>

Subsequently, similarly to the above, the second wound part 15A of the fourth conductor cylinder part 16D is formed. More specifically, in the vicinity of the first corner part 31a, the conductor 15 is caused to extend along the horizontal direction from the starting point 15s located being shifted upward by one pitch from the starting point 15s of the first wound part 15A, the extension being performed in the order of the vicinity of the second corner part 31b, the vicinity of the third corner part 31c, and the vicinity of the fourth corner part 31d to thereby form a first parallel part 15A1 including the extension parts 15A1-1, 15A1-2, and 15A1-3. Subsequently, similarly to the above, there is formed a second parallel part 15A2 that extends along the horizontal direction toward the ending point 15e located in the vicinity of the first corner part 31a through the first connecting part 15B1" extending along a diagonal direction in the vicinity of the fourth corner part 31d. Subsequently, in the vicinity of the first corner part 31a, the second connecting part 15B2' extending along a diagonal direction connects the second parallel part 15A2 with the next third wound part 15A (the third part from the bottom). With these operations, there is completed a second wound part 15A including the first parallel part 15A1, the first connecting part 15B1", the second parallel part 15A2, and the second connecting part 15B2'. At this time, the first parallel part 15A1, the first connecting part 15B1", the second parallel part 15A2, and the second connecting part 15B2' of the second wound part 15A are shifted upward by one pitch from the first parallel part 15A1, the first connecting part 15B1", the second parallel part 15A2, and the second connecting part 15B2' of the first wound part 15A, respectively.

Similarly to the above, the conductor 15 is wound by one turn approximately along the circumferential direction while being shifted upward by one pitch along the vertical direction to thereby sequentially generate other wound parts 15A adjacent upward such as the third wound part 15A from the bottom, the fourth wound part 15A from the bottom, . . . (see FIG. 3I). As described above, between the lower spacer part 32b and the upper spacer part 32a of the core pin part 31, the wound parts 15A are sequentially generated up to the wound part 15A on the highest row that reaches the upper spacer part 32a.

<Completion of Fourth Conductor Cylinder Part with Formation of Wound Part on Highest Row>

The wound part 15A on the highest row includes the first parallel part 15A1, the first connecting part 15B1", and the second parallel part 15A2, which are similar to those of the wound parts 15A on the other rows described above. Note that the second connecting part 15B2" is omitted. As a result, there is formed a fourth conductor cylinder part 16D (corresponding to the conductor cylinder part located on the outermost peripheral side) including the plural wound parts 15A arranged along the vertical direction from the lowest row to the highest row (see FIG. 3I). Then, the conductor 15, which further continues to the end of the second parallel part 15A2 on the highest row of the fourth conductor cylinder part 16D, is caused to extend upward from the through-hole 33b of the upper spacer part 32a in the vicinity of the first corner part 31a of the core pin part 31. The conductor 15 extending from the through-hole 33b is cut off at a predetermined position, and the remaining conductor 15 serves as the other wire connection part 15b.

Subsequently, the core pin part 31 is separated into the upper part and the lower part at a approximately half position (see the dotted line h in FIG. 3A and FIG. 3J) in the height direction. Subsequently, the upper half and the lower half of the separated core pin part 31 are taken out of the plural conductor cylinder parts 16A-16D to thereby obtain the unmolded coil 17 including plural conductor cylinder parts 16A-16D before molding. This unmolded coil 17 is pressure molded for the outer shape in the next second step to thereby obtain the coil 10.

<Outline of Second Step>

The second step will be described with reference to FIGS. 5A to 5C. Note that, in the following description, the vertical direction (height direction), the front-rear direction, and the left-right direction correspond to directions of the arrows illustrated as appropriate in the drawings including, for example, FIGS. 5A to 5C.

<Press Molding Device>

At the time of pressure molding the unmolded coil 17, a pressure molding device 40 is used. As illustrated in FIGS. 5A to 5C, the pressure molding device 40 includes a jig 41, a pair of supporting plates 42, 42, a pair of front and rear punches 43, 43, a pair of upper and lower front punches 44, 44, and a pair of upper and lower rear punches 45, 45.

The jig 41 is fitted with the hole part 18 of the unmolded coil 17 in a state that the unmolded coil 17 is maintained in the horizontal posture with the radial direction thereof being aligned with the horizontal direction. The unmolded coil 17 held with the jig 41 has the outer shape of a approximately rectangular shape or approximately square shape (approximately rectangular shape in this example) (see FIG. 5C). At this time, the approximately rectangular outer shape of the unmolded coil 17 has a approximately arc shape at each of the four corner parts. More specifically, the outer shape of the unmolded coil 17 includes left and right straight parts 17a, 17a corresponding to two long sides facing each other in the rectangular shape, front and rear straight parts 17b, 17b corresponding to two short sides facing each other in the rectangular shape, and the four arc parts 19 (corresponding to an example of four corner parts).

Furthermore, the pair of supporting plates 42, 42 supports the external surfaces of the straight parts 17a, 17a, respectively (see FIG. 5C). The pair of front and rear punches 43, 43 pressure molds the external surface of the straight parts 17b, 17b. The pair of upper and lower front punches 44, 44 and the pair of upper and lower rear punches 45, 45 pressure mold the upper and the lower external surfaces of the straight parts 17b, 17b, respectively. Note that the upper front punch 44 has through-holes, not illustrated, that allow the first protruding part 15a and the second protruding part 15b projecting externally from the unmolded coil 17 in the vertical direction to pass through. This enables the upper front punch 44 to move downward without interference from the first and the second protruding parts 15a, 15b at the time of pressure molding.

<Procedure of Pressure Molding>

At the time of pressure molding the unmolded coil using the pressure molding device 40, the front and rear punches 43, 43, the upper and lower front punches 44, 44, and the upper and lower rear punches 45, 45 are first brought close to the unmolded coil 17 in the arrow direction as illustrated in FIG. 5A. Then, as illustrated in FIG. 5B and FIG. 5C, the front and rear punches 43, 43 are brought into contact with the external surfaces of the straight parts 17b, 17b to press them. Furthermore, the upper and lower front punches 44, 44 are brought into contact with the upper and lower external surfaces of the straight part 17b on the front side, and press them, and the upper and lower rear punches 45, 45 are brought into contact with the upper and lower external surfaces of the straight part 17b on the rear side, and press them. With the pressure described above, in the unmolded coil 17, the straight parts 17a, 17a and the straight parts 17b, 17b, except for the arc parts 19, are smoothly molded. With this operation, it is possible to obtain the coil 10 having a approximately rectangular cross section in which the arc parts 19 each have a approximately arc shape and the straight parts 17a, 17a, 17b, and 17b other than the arc parts 19 are formed so as to be smooth.

At this time, as can be understood by comparing FIGS. 4A to 4D or FIGS. 3A to 3K with FIG. 5C, the first connecting parts 15B1, 15B1', and 15B1" and the second connecting parts 15B2, 15B2', and 15B2", each included in the first to the fourth conductor cylinder parts 16A-16D, are located in four corner part areas R1-R4 (equivalent to parts corresponding to the four corner parts) corresponding to the respective arc parts 19. As molding is performed except for the arc parts 19 as described above, molding is not performed on these first connecting parts 15B1, 15B1', and 15B1" and the second connecting parts 15B2, 15B2', and 15B2". Note that, in this example, the first protruding part 15a and the second protruding part 15b, vertically projecting from the coil 10 as described above, are located in any one (the corner part R1 on the right front side in this example) of the four corner part areas R1-R4 corresponding to the respective four arc parts 19 of the coil 10. Note that, in the case where no specific corner part area is set from among the corner part areas R1-R4, the corner part area is simply referred to as a "corner part area R" as necessary in the description below.

For the coil 10 obtained through molding as described above, electric current is supplied to the conductor 15 through the first protruding part 15a and the second protruding part 15b. Insulation coating is fused due to heat generated in the conductor 15, and conductors 15 are solidified in an insulating manner, whereby the coil 10 is in use. Note that, in the case where a non-bonding line, of which insulation film does not have the thermal fusion property, is used for the conductor 15, it may be possible to apply heat-hardening adhesive to the coil 10 from the outside thereof, and heat and harden the adhesive, thereby causing conductors 15 to adhere to each other and solidify.

<Effect of First Embodiment>

As described above, in the linear motor 1 according to this embodiment, plural coils 10 are secured to the armature base 7 of the armature 3. In each of the coils 10, the conductor 15 is wound in a predetermined circumferential direction while being shifted by one pitch in the vertical direction perpendicular to the circumferential direction, thereby forming the conductor cylinder parts 16A-16D.

In each of the conductor cylinder parts 16, each of the wound parts 15A disposed along the axial direction includes the parallel parts 15A1 and 15A2, the first connecting part 15B1, and the second connecting part 15B2. Furthermore, in this embodiment, the coil 10 has a approximately rectangular shape whose four corners serve as arc parts 19. In addition, the first connecting part 15B1 and the second connecting part 15B2, each of which can be a so-called stepped part, are arranged in the corner part areas R (see FIG. 5C) corresponding to the arc parts 19.

As described above, with the connecting parts 15B1 and 15B2 being disposed in the corner part areas R, no stepped part exists in an area other than the corner part areas R. With this configuration, it is possible to sufficiently apply a pressure to the areas corresponding to the straight parts 17a, 17a, 17b, and 17b and excluding the corner part areas R, thereby making the surfaces of the straight parts 17a, 17a, 17b, and 17b smooth. As a result, when the coil 10 is secured to the armature base 7 of the linear motor 1 and is used as described above, it is possible to sufficiently bring the straight part 17a or 17b of the coil 10 into close contact with the inner surface 11a of the recessed part 11 of the bracket 9. This makes it possible to dissipate heat generated from the coil 10, from the closely contacted part to the armature base 7 side, thereby efficiently performing cooling.

Furthermore, in this embodiment, in particular, the first protruding part 15a corresponding to the winding start side and the second protruding part 15b corresponding to the winding end side, where the conductor 15 of the coil 10 is connected with the outside of the coil to establish the wire connection, are provided on the corner part areas R. With this configuration, regardless of whether these protruding parts 15a, 15b exist or not, it is possible to secure the smoothness of the surfaces of the straight parts 17a, 17a, 17b, and 17b in the rectangular shape. Furthermore, each of the protruding parts 15a and 15b is provided so as to protrude in the vertical direction, rather than in the radial direction. As a result, it is possible to prevent an increase in the size of the entire coil 10 in the radial direction, and reduce the space necessary for loading the coil 10. Thus, it is possible to prevent an increase in the size of the linear motor 1 in the traveling direction (in the left-right direction in FIG. 2) or in the widthwise direction (in the left-right direction in FIG. 1) perpendicular to the traveling direction.

Furthermore, in this embodiment, in particular, the first protruding part 15a and the second protruding part 15b are arranged in one common corner part area R (the corner part area R1 in the example described above) of the corner part areas R1-R4. By arranging the first protruding part 15a and the second protruding part 15b in the same corner part area R as described above, it is possible to reduce the distance between these two protruding parts 15a and 15b, whereby it is possible to securely reduce the size of a structure for connecting wires with the linear motor 1 side.

It should be noted that, in addition to the configuration in which the first protruding part 15a and the second protruding part 15b are arranged in one common corner part area R as described above, it may be possible to employ a configuration in which they are arranged in different corner part areas R. In this case, in the rectangular shape, it is preferable to separately arrange the first protruding part 15a and the second protruding part 15b to the corner part areas R1 and R4 corresponding to both ends of one specific short side, in other words, both ends of the straight part 17b on the front side, or the corner part areas R2 and R3 corresponding to both ends of the straight part 17b on the rear side. The reason for this will be described below.

More specifically, in the case where the entire outer shape of the coil 10 has a rectangular shape as described above, if the first protruding part 15a and the second protruding part 15b are separately arranged in the corner part area R1 and the corner part area R2 (or the corner part area R3 and the corner part area R4) corresponding to both ends of the straight part 17a corresponding to the long side along the straight part 17a, the two protruding parts 15a and 15b are largely spaced apart from each other, which leads to an increase in the size of a structure for connecting wires with the linear motor 1 side. Thus, by separately arranging the first protruding part 15a and the second protruding part 15b in the corner part area R1 and the corner part area R4 (or the corner part area R2 and the corner part area R3), it is possible to relatively reduce the distance between these two protruding parts 15a and 15b, whereby it is possible to reduce the size of the structure for connecting wires.

It should be noted that, in the description above, two connecting parts that can serve as the stepped parts are disposed such that one connecting part (the first connecting part 15B1 in the example described above) of the two connecting parts is disposed on the corner part area R4 located on the left front side, and the other connecting part (the second connecting part 15B2 in the example described above) is disposed on the corner part area R1 on the right front side. However, the configuration thereof is not limited to this. In other words, it may be possible to employ, for example, a configuration in which one of the two connecting parts is disposed on the corner part area R3 on the left rear side and the other one is disposed on the corner part area R1 on the right front side so that these connecting parts are disposed on two corner parts R facing each other with respect to a diagonal line of the approximately rectangular shape described above. Alternatively, it may be possible to employ a configuration in which one of the two connecting parts is disposed on the corner part area R2 on the right rear side, and the other one is disposed on the corner part area R4 on the left front side. In the case where arrangement is made so as to face each other with respect to the diagonal line as described above, it is possible to prevent the connecting parts B1 and B2 of plural coils 10 adjacent to each other from being brought close to each other. As a result, it is possible to improve an assemble property at the time of attaching plural coils 10 to the core 8.

It should be noted that these descriptions have been made by giving an example in which the linear motor 1 is configured such that the field system 2 serves as a stator and the armature 3 serves as a mover. However, the configuration is not limited to this. In other words, it may be possible to configure the rotating electrical machine such that the armature 3 serves as a stator and the field system 2 serves as a mover.

It should be noted that the embodiment disclosed herein is not limited to those described above, and various modifications are possible without departing from the spirit and the technical idea of the embodiment.

More specifically, in the first embodiment, a round copper wire is used for the conductor 15 of the coil 10. However, it may be possible to use, for example, a rectangular wire (rectangular copper wire) having cross section with a flattened rectangular shape for the conductor 15. FIGS. 6A to 6F illustrate an example of a winding step in accordance with the modification example described above, which is similar to that in FIGS. 3A to 3K. The state illustrated in FIG. 6A corresponds to that in FIG. 3B; the state illustrated in FIG. 6B corresponds to that in FIG. 3D; the state illustrated in FIG. 6C corresponds to that in FIG. 3F; the state illustrated in FIG. 6D corresponds to that in FIG. 3I; the state illustrated in FIG. 6E corresponds to that in FIG. 3I; and the state illustrated in FIG. 6F corresponds to that in FIG. 3J. As illustrated in FIGS. 6A to 6F, winding of the conductor 15 according to this modification example is similar to that in the first embodiment except that the rectangular wire is used for the conductor 15.

According to this modification example, it is possible to obtain an effect similar to that of the first embodiment.

<Second Embodiment>

Subsequently, a rotating electrical machine according to a second embodiment will be described with reference to FIG. 7.

<Configuration of Rotating Electrical Machine>

As illustrated in FIG. 7, a rotating electrical machine 50 according to this embodiment includes a rotor 52, which is a field system supported in a freely rotatable manner, a approximately cylindrical stator 53, which is an armature, a cylindrical frame 55, a load-side bracket 56, a load-side bearing 57, an opposite load-side bracket 58, an opposite load-side shaft 59, and a shaft 60 (corresponding to an example of a rotating shaft). In this example, the rotating electrical machine 50 is an interior permanent magnet synchronous motor having the rotor 52 inside of the stator 53.

The frame 55 is disposed on the outer peripheral side of the stator 53. The load-side bracket 56 is disposed on the load-side of the frame 55 (right side in FIG. 7). The opposite load-side bracket 58 is disposed on the opposite load-side of the frame 55 (left side in FIG. 7). The load-side bracket 56 and the opposite load-side bracket 58 are fastened to the frame 55 with a bolt, not illustrated.

The load-side bearing 57 has an outer rim fitted with the load-side bracket 56. The opposite load-side bearing 59 has an outer rim fitted with the opposite load-side bracket 58 on the opposite side to the load-side. The shaft 60 is supported, in a freely rotatable manner, with the load-side bracket 56 and the opposite load-side bracket 58 through the load-side bearing 57 and the opposite load-side bearing 59. An encoder 62 that detects rotational positions of the rotor 52 is disposed on the opposite load-side of the shaft 60 (left side in FIG. 7). The load-side bracket 56 has a dust seal 61 disposed on the axially outer side than the load-side bearing 57 (right side in FIG. 7) to prevent foreign substances from entering the inside of the rotor 52.

The rotor 52 includes a approximately cylindrical rotor core 64 having a hole part 63 extending along the axial direction, and plural permanent magnets, not illustrated, embedded in the rotor core 64 for each pole in the axial direction. With these configurations, the rotor 52 is configured as a field system part having an interior magnet type with plural poles. The shaft 60 is fitted into the hole part 63 of the rotor core 64.

<Detailed Structure of Stator>

The stator 53 is disposed so as to surround the outer peripheral side of the rotor 52 in the radial direction with a magnetic air gap therebetween, and is secured to the load-side bracket 56 and the opposite load-side bracket 58. The stator 53 includes a approximately cylindrical stator core 66 (stator iron core), and the plural coils 10 secured to the stator core 66. The stator core 66 includes plural teeth, not illustrated, arranged in the circumferential direction and each extending along the radial direction, and a slot, not illustrated, is formed between two adjacent teeth. Each of the coils 10 is accommodated in the slot in a manner such that the hole part 18 of the coil 10 on the inner peripheral side is fitted with each of the teeth. Furthermore, parts of each of the coils 10 exposed from the stator core 66 and located on the load-side and the opposite load-side are accommodated in respective recessed parts 67 of the load-side bracket 56 and the opposite load-side bracket 58. More specifically, the coils 10 are arranged in a state where the straight parts 17b and 17b (or 17a and 17a) of each of the coils 10 are brought into close contact with the inner surface 67a of each of the recessed parts 67 of the load-side bracket 56 and the opposite load-side bracket 58.

A detailed configuration of each of the coils 10, a method of winding the conductor 15, and a method for pressure molding are similar to those described with reference to FIGS. 3A to 3K to FIGS. 6A to 6F in the first embodiment and the modification examples thereof. In other words, in each of the coils 10, the conductor cylinder parts 16A-16D are configured by winding the conductor 15 in a predetermined circumferential direction while shifting the conductor 15 for each winding by one pitch in the first direction perpendicular to the circumferential direction described above.

Furthermore, a refrigerant flow path 68 is provided in the load-side bracket 56 and the opposite load-side bracket 58 so as to be brought close to the coils 10 accommodated in the recessed part 67. The refrigerant flow path 68 allows a predetermined refrigerant (for example, cooling water) supplied from an external pipe 69 to circulate therethrough to thereby cool heat generated from the coils 10. On the opposite load-side of the stator core 66, the wire connection part 14 is disposed between the coil 10 and the frame 55. At this time, the first protruding part 15a and the second protruding part 15b protruding from the coil 10 are connected with the external power source through a wire connection part, not illustrated, and electric power is supplied from the external power source through the wire connection part, the protruding parts 15a and 15b, and the wire connection part 14b to the coils 10.

<Effect of Second Embodiment>

The rotating electrical machine 50 according to this embodiment having the configuration as described above achieves an effect similar to that obtained from the first embodiment. In other words, plural coils 10 are inserted into and disposed to the respective slots of the stator core 66. In each of the coils 10, the conductor 15 is wound in a predetermined circumferential direction while being shifted by one pitch for each winding in the first direction perpendicular to the circumferential direction described above, thereby forming the conductor cylinder parts 16A-16D. In each of the conductor cylinder parts 16, plural wound parts 15A arranged in the axial direction each include the parallel parts 15A1 and 15A2, the first connecting part 15B1, and the second connecting part 15B2. Each of the coils 10 has a approximately rectangular outer shape, four corners of which each serve as the arc part 19. Furthermore, the first connecting part 15B1 and the second connecting part 15B2, each of which serves as a so-called stepped part, are arranged in corner part areas R (see FIG. 5C) corresponding to the respective arc parts 19. With the connecting parts 15B1 and 15B2 being disposed on the corner part areas R, no stepped part exists in areas other than the corner part areas. This makes it possible to sufficiently apply a pressure to the areas corresponding to the straight parts 17a, 17a, 17b, and 17b other than the corner part areas R to make the surfaces of the straight parts 17a, 17a, 17b, and 17b smooth. With this configuration, in the case where the coils 10 are secured to the recessed parts 67 of the slots of the rotating electrical machine 50 as described above, and are used, it is possible to sufficiently bring the straight parts 17b and 17b (or 17a and 17a) of each of the coils 10 into close contact with the inner surface 67a of each of the recessed parts 67. As a result, heat generated from the coils 10 can be dissipated from the closely contacted part to the brackets 56 and 58, the stator core 66, or the like to thereby efficiently perform cooling.

Furthermore, in this embodiment, in particular, the plural coils 10 are each arranged so as to be brought into approximately close contact with the recessed parts 67 of the load-side bracket 56 and the opposite load-side bracket 58 that face each other with respect to the axial direction of the shaft 60. As described above, by sufficiently bringing the coils 10 into close contact with both of the load-side bracket 56 and the opposite load-side bracket 58, heat generated from the coils 10 can be dissipated from the closely contacted part to both of the brackets 56 and 58 on the load-side and on the opposite load-side, whereby it is possible to efficiently perform cooling in a reliable manner.

Furthermore, in this embodiment, in particular, parts of the load-side bracket 56 and the opposite load-side bracket 58 that face the coil 10 with respect to the axial direction of the shaft 66 include the refrigerant flow path 68 that allows refrigerant to pass through. With this configuration, a water-cooling function is provided to the load-side bracket 56 and the opposite load-side bracket 58 to which heat from the coils 10 arc transferred, whereby it is possible to efficiently perform cooling in a more reliable manner.

Furthermore, in this embodiment, in particular, each of the protruding parts 15a and 15b of each of the coils 10 is provided so as to protrude in the first direction (in the axial direction of each of the coils), rather than in the second direction (in the so-called radial direction). As a result, the size of the entire coil 10 in the second direction (radial direction of the coil) can be prevented from increasing. Thus, in the case where the second direction of each of the coils 10 is arranged along the axial direction of the shaft 60 as illustrated in FIG. 7, it is possible to prevent an increase in the size of the rotating electrical machine 50 in the axial direction along the shaft 60.

Descriptions have been made by giving an example in which the rotating electrical machine 50 includes the rotor 52 corresponding to an example of a field system, and the stator 53 corresponding to an example of an armature. However, it may be possible to configure the rotating electrical machine such that the rotor serves as the armature, and the stator serves as the field system.

Furthermore, in addition to those described above, it may be possible to combine the methods according to embodiments and the modification examples as appropriate, and use it.

Moreover, although specific examples are not given, the embodiments or the modification examples are variously modified without departing from the spirit thereof, and are carried out.

What is claimed is:

1. A coil including a plurality of wound parts formed by winding a conductor by one turn approximately along a predetermined circumferential direction from a starting point to an ending point, the plurality of wound parts being arranged along a first direction perpendicular to the circumferential direction, an outer shape of the coil as viewed from the first direction has an approximately rectangular shape or an approximately square shape with four corner parts, the coil comprising:
   at least one parallel part extended parallelly along the circumferential direction; and
   at least one connecting part arranged at a portion corresponding to any of the four corner parts, the at least one connecting part being extended along a diagonal direction with respect to the circumferential direction to connect the two parallel parts, wherein
   portions corresponding to two pairs of two sides facing each other in the approximately rectangular shape or the approximately square shape of the outer shape of the coil except for the four corner parts are pressure molded.

2. The coil according to claim 1, further comprising:
   a first protruding part corresponding to a winding start that projects toward the outside of the coil along the first direction; and
   a second protruding part corresponding to a winding end that projects toward the outside of the coil along the first direction, and
   the first protruding part and the second protruding part are each arranged in a portion corresponding to any of the four corner parts.

3. The coil according to claim 2, wherein;
   the outer shape of the coil has the approximately rectangular shape including two long sides facing each other and two short sides facing each other, and
   the first protruding part and the second protruding part are separately disposed in respective portions corresponding to two corner parts located at both ends of a specific short side of the four corner parts.

4. The coil according to claim 2, wherein;
   the first protruding part and the second protruding part are each arranged in a portion corresponding to one common corner part of the four corner parts.

5. A rotating electrical machine comprising:
a rotor including a rotating shaft; and
a stator including a stator core and a plurality of coils, the stator core including a plurality of slots arranged in a circumferential direction, the plurality of coils being inserted into the plurality of slots,
each of the plurality of coils includes a plurality of wound parts formed by winding a conductor by one turn approximately along a predetermined circumferential direction from a starting point to an ending point, the plurality of wound parts are arranged along a first direction perpendicular to the circumferential direction, an outer shape of the coil as viewed from the first direction has an approximately rectangular shape or an approximately square shape with four corner parts, the coil comprising:
at least one parallel part extended parallelly along the circumferential direction; and
at least one connecting part arranged at a portion corresponding to any of the four corner parts, the at least one connecting part being extended along a diagonal direction with respect to the circumferential direction to connect the two parallel parts, wherein
portions corresponding to two pairs of two sides facing each other in the approximately rectangular shape or the approximately square shape of the outer shape of the coil except for the four corner parts are pressure molded in a manner such that the outer shape of the coil matches the shape of the corresponding slot.

6. The rotating electrical machine according to claim 5, wherein;
each of the plurality of coils is arranged so as to be brought into approximately close contact with a load side bracket and an opposite load side bracket facing each other in an axial direction of the rotating shaft.

7. The rotating electrical machine according to claim 6, wherein;
the load side bracket and the opposite load side bracket each include a flow path in which refrigerant circulates at a portion facing the coil in the axial direction.

8. The rotating electrical machine according to claim 7, wherein;
each of the plurality of coils includes:
a first protruding part corresponding to a winding start that projects toward the outside of the coil along the first direction; and
a second protruding part corresponding to a winding end that projects toward the outside of the coil along the first direction,
the first protruding part and the second protruding part are each arranged in a portion corresponding to any of the four corner parts, and
the rotating electrical machine further comprises a wire connection part that connects the first protruding part and the second protruding part of the plurality of coils, the wire connection part being arranged at an area on the outer peripheral side than the plurality of coils.

9. A linear motor comprising:
a field system including a plurality of permanent magnets linearly arranged; and
an armature arranged so as to face the plurality of permanent magnets in parallel to each other via a magnetic air gap, the armature including an armature base and a plurality of coils secured to the armature base,
either one of the field system and the armature being used as a stator and the other one being used as a mover, the mover being traveled along a predetermined traveling direction,
each of the plurality of coils includes a plurality of wound parts formed by winding a conductor by one turn approximately along a predetermined circumferential direction from a starting point to an ending point, the plurality of wound parts are arranged along a first direction perpendicular to the circumferential direction, an outer shape of the coil as viewed from the first direction has an approximately rectangular shape or an approximately square shape with four corner parts, the coil comprising:
at least one parallel part extended parallelly along the circumferential direction; and
at least one connecting part arranged at a portion corresponding to any of the four corner parts, the at least one connecting part being extended along a diagonal direction with respect to the circumferential direction to connect the two parallel parts, wherein
portions corresponding to two pairs of two sides facing each other in the approximately rectangular shape or the approximately square shape of the outer shape of the coil except for the four corner parts are pressure molded.

10. The linear motor according to claim 9, wherein;
the armature further includes
a bracket secured to the armature base to accommodate and arrange the plurality of coils, and
each of the plurality of coils is arranged so as to be brought into approximately close contact with the bracket.

11. The linear motor according to claim 10, wherein;
each of the plurality of coils includes:
a first protruding part corresponding to a winding start that projects toward the outside of the coil along the first direction; and
a second protruding part corresponding to a winding end that projects toward the outside of the coil along the first direction,
the first protruding part and the second protruding part are each arranged in a portion corresponding to any of the four corner parts, and
the linear motor further comprises a wire connection part that connects the first protruding part and the second protruding part of the plurality of coils, the wire connection part being arranged at an area between the plurality of coils and the armature base.

12. A coil, in which a conductor is wound by one turn approximately along a predetermined circumferential direction from a starting point to an ending point to generate one wound part, then the conductor is shifted by one pitch in a first direction perpendicular to the circumferential direction, and further the conductor is wound by one turn approximately along the circumferential direction to sequentially generate another wound part adjacent to the one wound part in the first direction, thereby forming a conductor cylinder part including a plurality of wound parts arranged along the first direction, and
after the one conductor cylinder part is formed, another conductor cylinder part adjacent to the one conductor cylinder part in a second direction perpendicular to the first direction is sequentially formed, thereby forming the coil including a plurality of conductor cylinder parts arranged along the second direction, wherein;

the conductor is wound in a manner such that the outer shape of the coil when viewed from the first direction has an approximately rectangular shape or an approximately square shape with four corner parts each having an approximately arc shape, the one wound part includes:

at least one parallel part extended along the circumferential direction in a manner such that a position of the at least one parallel part in the first direction is located on the same pitch as the starting point or is shifted from the starting point by a half pitch, which is a half of the one pitch; and at least one connecting part that connects the two parallel parts of which positions in the first direction are spaced apart from each other by the half pitch, or connects the ending point located at an end of the parallel part with the starting point of the another wound part, positions of the ending point and the starting point in the first direction being spaced apart from each other by the half pitch, and the connecting part is arranged at a portion corresponding to any of the four corner parts.

13. A rotating electrical machine comprising:

a rotor including a rotating shaft;

a load side bracket and an opposite load side bracket that rotatably support the rotating shaft on the load side and the opposite load side, respectively; and an approximately cylindrical stator disposed so as to surround an outer peripheral side of the rotor and secured to the load side bracket and the opposite load side bracket, respectively, the stator including a stator core including a plurality of slots arranged in a circumferential direction of the cylindrical shape, and a plurality of coils inserted into the plurality of slots, wherein;

each of the plurality of coils, in which a conductor is wound by one turn approximately along a predetermined circumferential direction from a starting point to an ending point to generate one wound part, then the conductor is shifted by one pitch in a first direction perpendicular to the circumferential direction, and further the conductor is wound by one turn approximately along the circumferential direction to sequentially generate another wound part adjacent to the one wound part in the first direction, thereby forming a conductor cylinder part including a plurality of wound parts arranged along the first direction, and after the one conductor cylinder part is formed, another conductor cylinder part adjacent to the one conductor cylinder part in a second direction perpendicular to the first direction is sequentially formed, thereby forming the coil including a plurality of conductor cylinder parts arranged along the second direction, the conductor is wound in a manner such that the outer shape of the coil when viewed from the first direction has an approximately rectangular shape or an approximately square shape with four corner parts each having an approximately arc shape, the one wound part includes:

at least one parallel part extended along the circumferential direction in a manner such that a position of the at least one parallel part in the first direction is located on the same pitch as the starting point or is shifted from the starting point by a half pitch, which is a half of the one pitch; and at least one connecting part that connects the two parallel parts of which positions in the first direction are spaced apart from each other by the half pitch, or connects the ending point located at an end of the parallel part with the starting point of the another wound part, positions of the ending point and the starting point in the first direction being spaced apart from each other by the half pitch, and the connecting part is arranged at a portion corresponding to any of the four corner parts.

14. A linear motor comprising:

a field system including a plurality of permanent magnets linearly arranged; and an armature arranged so as to face the plurality of permanent magnets in parallel to each other via a magnetic air gap, the armature including an armature base and a plurality of coils secured to the armature base, either one of the field system and the armature being used as a stator and the other one being used as a mover, the mover being traveled along a predetermined traveling direction, wherein;

each of the plurality of coils, in which a conductor is wound by one turn approximately along a predetermined circumferential direction from a starting point to an ending point to generate one wound part, then the conductor is shifted by one pitch in a first direction perpendicular to the circumferential direction, and further the conductor is wound by one turn approximately along the circumferential direction to sequentially generate another wound part adjacent to the one wound part in the first direction, thereby forming a conductor cylinder part including a plurality of wound parts arranged along the first direction, and after the one conductor cylinder part is formed, another conductor cylinder part adjacent to the one conductor cylinder part in a second direction perpendicular to the first direction is sequentially formed, thereby forming the coil including a plurality of conductor cylinder parts arranged along the second direction, the conductor is wound in a manner such that the outer shape of the coil when viewed from the first direction has an approximately rectangular shape or an approximately square shape with four corner parts each having an approximately arc shape, the one wound part includes:

at least one parallel part extended along the circumferential direction in a manner such that a position of the at least one parallel part in the first direction is located on the same pitch as the starting point or is shifted from the starting point by a half pitch, which is a half of the one pitch; and at least one connecting part that connects the two parallel parts of which positions in the first direction are spaced apart from each other by the half pitch, or connects the ending point located at an end of the parallel part with the starting point of the another wound part, positions of the ending point and the starting point in the first direction being spaced apart from each other by the half pitch, and the connecting part is arranged at a portion corresponding to any of the four corner parts.

* * * * *